Figure 1:
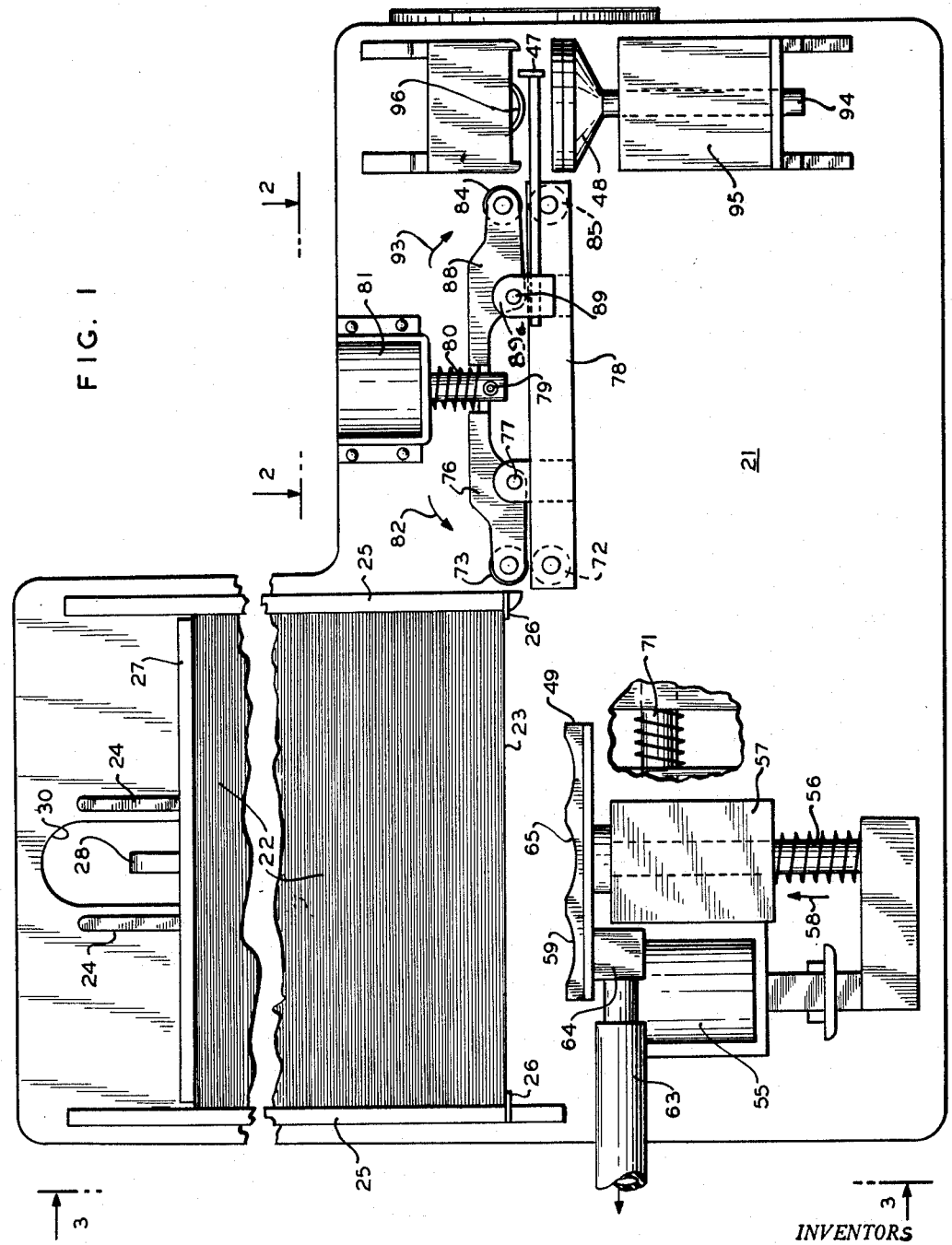

May 19, 1964  R. F. HERTER ETAL  3,133,784
CARD ISSUING MACHINE

Filed Oct. 6, 1961  7 Sheets-Sheet 1

INVENTORS
HAROLD T. SHER
RAYMOND F. HERTER
BY
ATTORNEY

May 19, 1964  R. F. HERTER ETAL  3,133,784
CARD ISSUING MACHINE
Filed Oct. 6, 1961  7 Sheets-Sheet 2

INVENTORS
HAROLD T. SHER
RAYMOND F. HERTER
BY
ATTORNEY

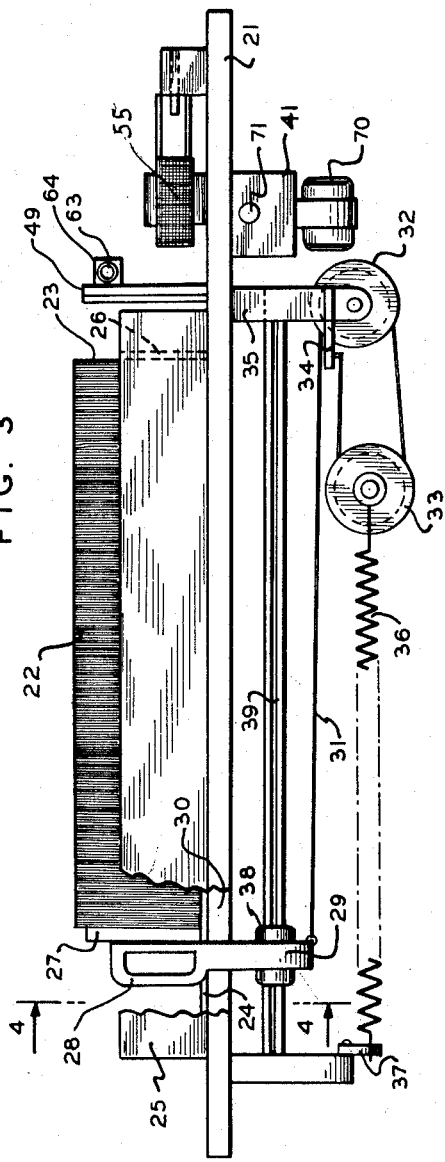
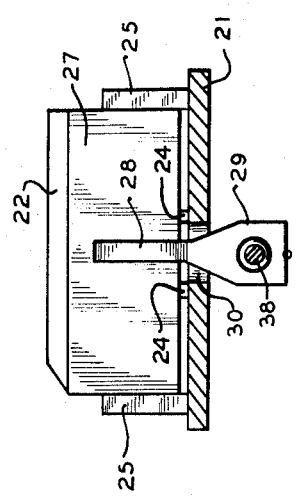

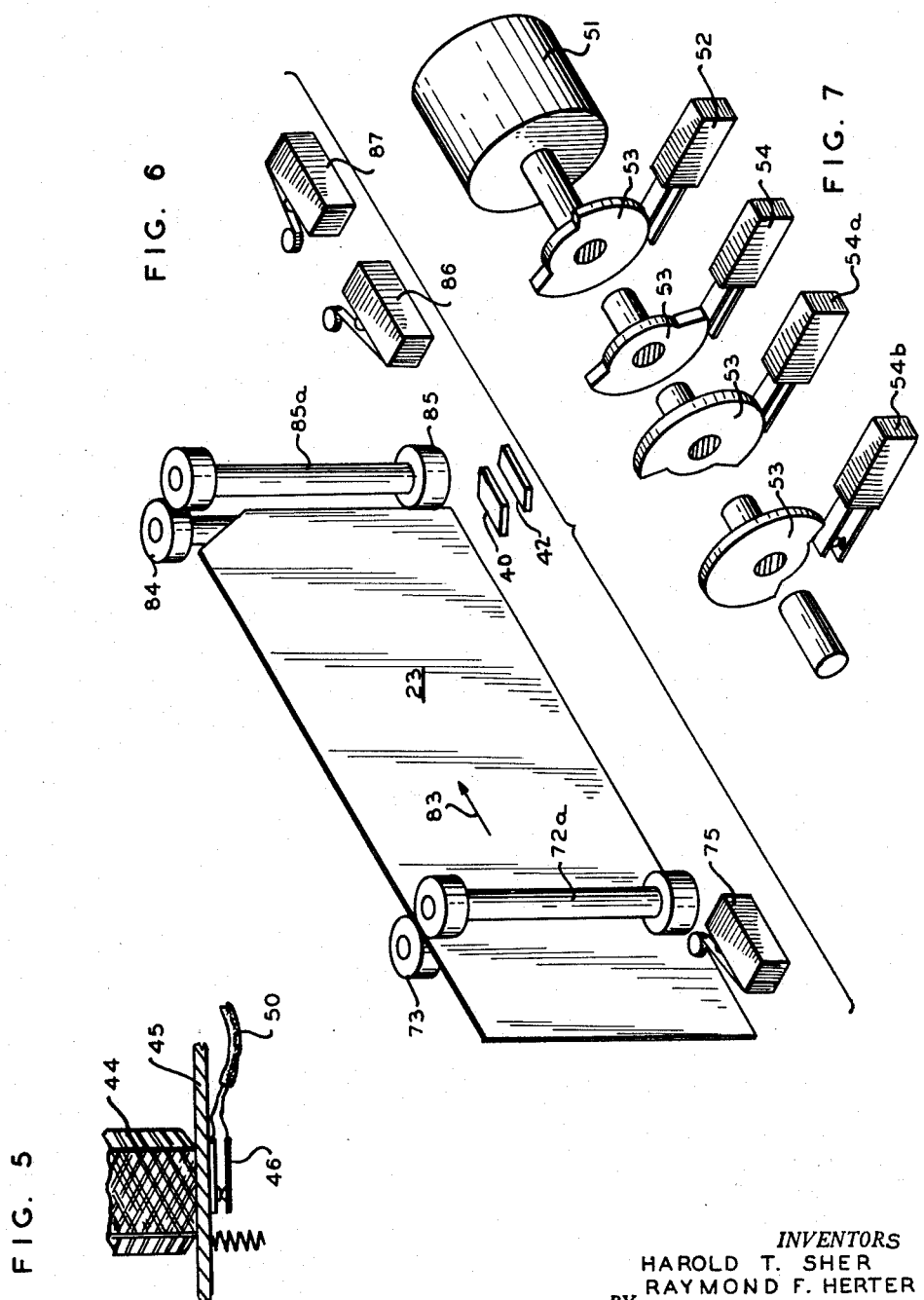

May 19, 1964 R. F. HERTER ETAL 3,133,784
CARD ISSUING MACHINE
Filed Oct. 6, 1961 7 Sheets-Sheet 5

INVENTORS
HAROLD T. SHER
RAYMOND F. HERTER
BY
ATTORNEY

INVENTORS
HAROLD T. SHER
RAYMOND F. HERTER
ATTORNEY

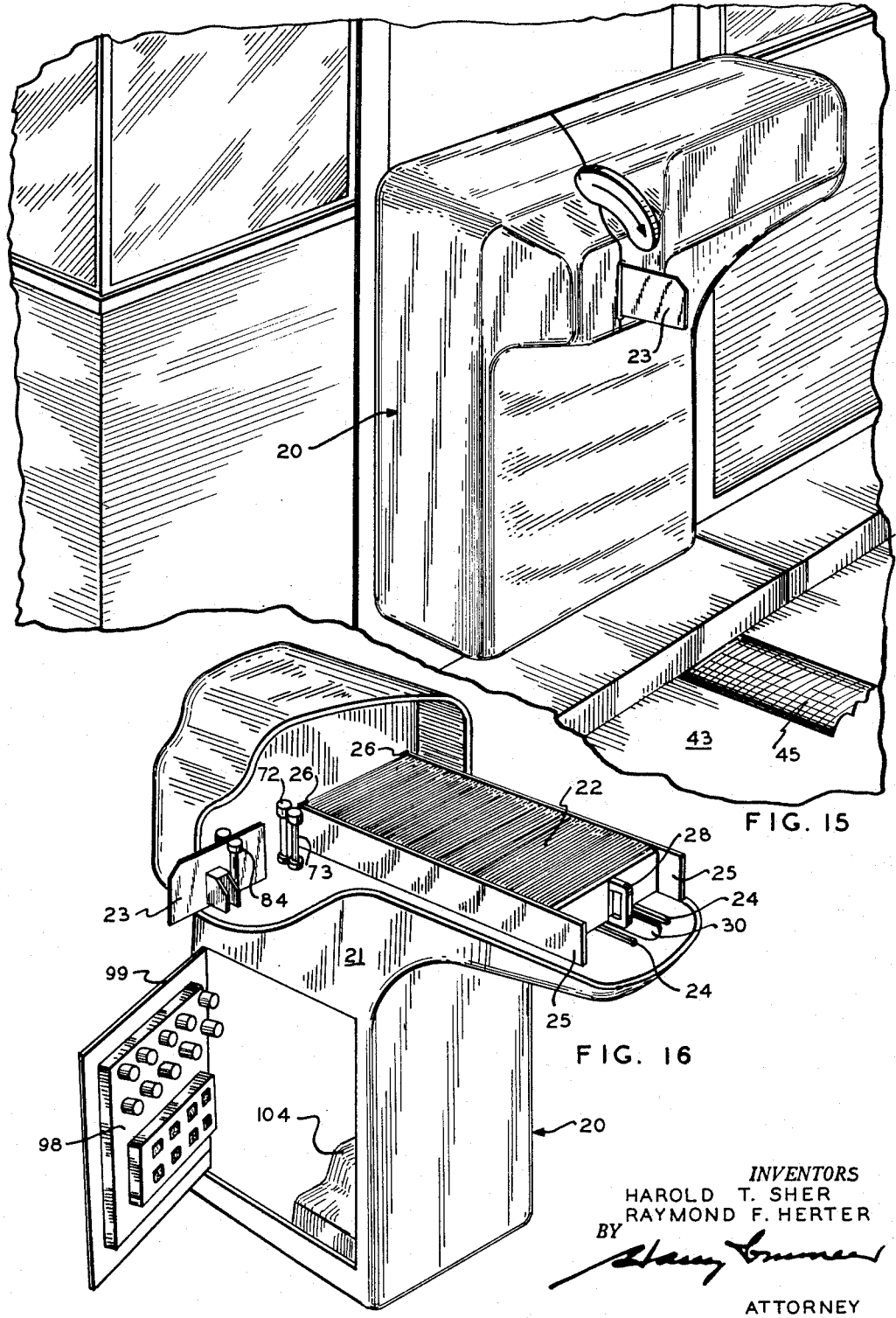

United States Patent Office 3,133,784
Patented May 19, 1964

3,133,784
CARD ISSUING MACHINE
Raymond F. Herter, Middletown, and Harold T. Sher, Lincroft, N.J., assignors to United Telecontrol Electronics, Inc., Wall Township, N.J., a corporation of New Jersey
Filed Oct. 6, 1961, Ser. No. 143,420
6 Claims. (Cl. 346—40)

This invention relates to a machine for issuing cards, such as are used in electronic, accounting and other card marking or punching systems, for parking lots and other end uses, as will be apparent to those skilled in this art, from this disclosure, including novel means for automatically sensing, moving and marking such cards or tickets on occurrence of a condition such as a lapse of time, movement of the card or of another object to a predetermined position, or other sensed condition.

The invention incorporates novel features of construction and operation exemplified in the drawings and below described to enable those skilled in this art to utilize the invention; modifications within the scope of the claims, shall be deemed within the purview of the invention and covered thereby.

Further objects will become apparent from the specification and the appended claims.

Figure 2:
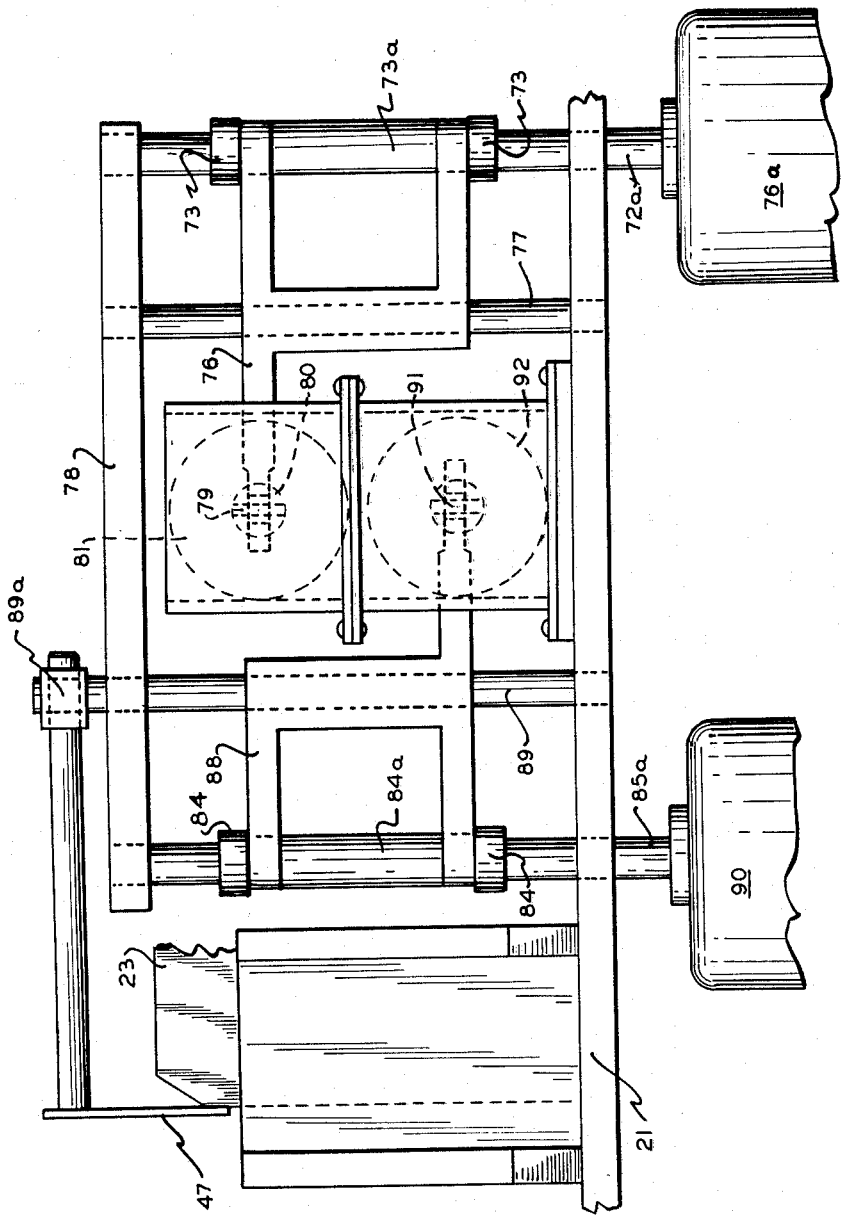
Figure 8:
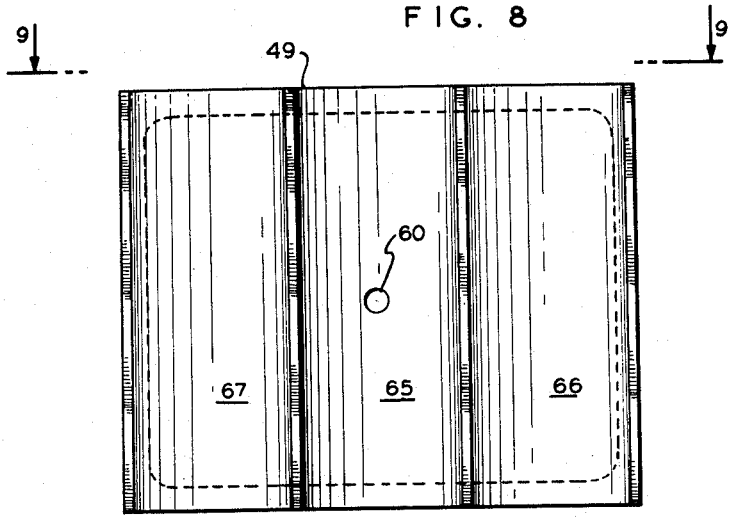
Figure 9:
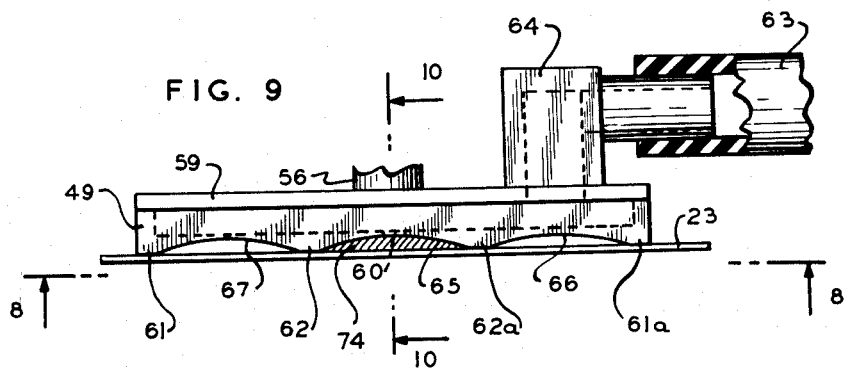
Figure 10:
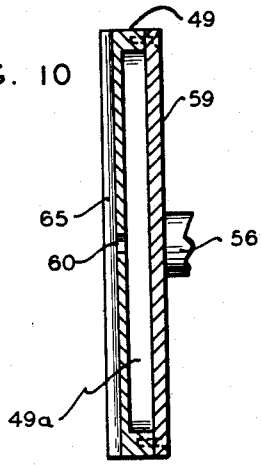
Figure 11:
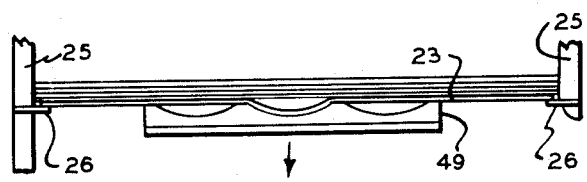
Figure 11A:
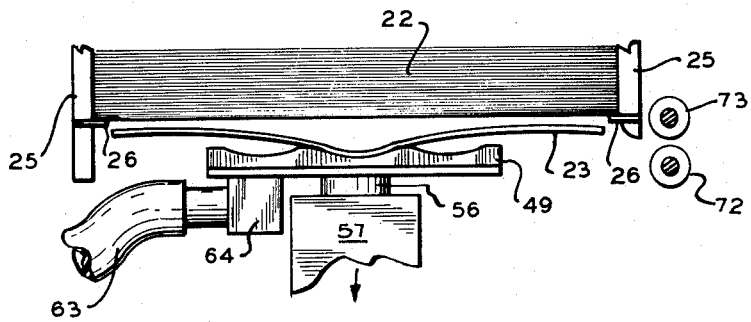
Figure 12:
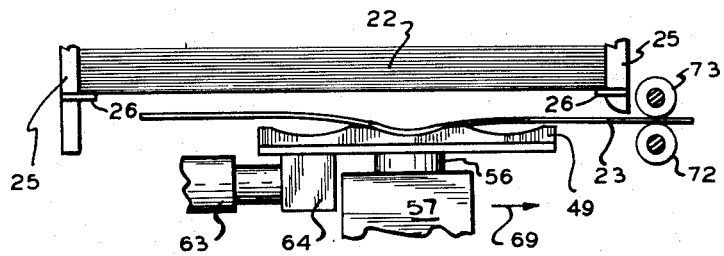
Figure 13:
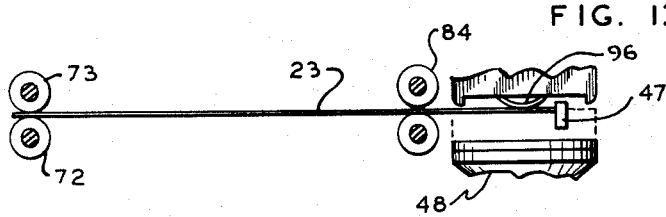
Figure 14:
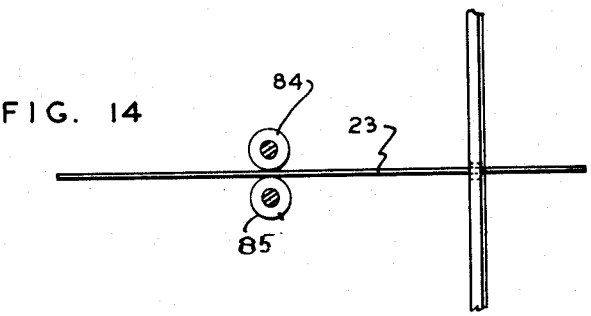

In the drawings, wherein similar reference characters indicate like figures:

FIG. 1 is a partly broken top plan view of a device embodying the invention,

FIG. 2 is an enlarged, fragmentary, rear elevational view thereof, taken at lines 2—2 of FIG. 1, FIG. 3 is a partly broken side elevational view thereof, taken at line 3—3 of FIG. 1, FIG. 4 is an end elevational view, taken at line 4—4 of FIG. 3, FIG. 5 is a schematic view, showing a switch to be actuated to thereby cycle parts of the machine, FIG. 6 is a schematic, perspective view, showing a ticket and parts for movement thereof into contact with switches actuating ticket printing and moving means, FIG. 7 is a schematic perspective view of cam-switch-timing means which may be used in carrying out the invention, FIG. 8 is a front elevational view of a casing member for movement against the end ticket of the stack to separate it from the stack, FIG. 9 is a fragmentary side elevational view thereof, showing a vacuum line connected to the interior of the casing taken at line 9—9 of FIG. 8, FIG. 10 is a horizontal sectional view of the casing taken at line 10—10 of FIG. 8, FIG. 11 is a schematic top plan view showing the casing positioned against and initially medially drawing the end ticket onto the casing, FIG. 11a is a similar view showing the end ticket separated from the stack, FIG. 12 is a similar view, showing said ticket then moved laterally to engage driving rollers, FIG. 13 is a schematic top plan view showing the ticket moved to a different (printing) position, FIG. 14 shows the ticket moved therefrom to an exposed position, FIG. 15 is a perspective view showing use of the invention in a turnpike toll station, a card or ticket being shown exposed through the casing, FIG. 16 is a perspective view of the casing shown open to expose details of construction, below more particularly described.

The machine 20 is exemplarily shown (FIGS. 15, 16) to comprise a casing 21 whereon the stack 22 (FIG. 1) of tickets to be issued is horizontally disposed; the aggregate weight of the stack of tickets thus does not bear against the end ticket 23 to be issued by the machine; said stack of tickets may be disposed slightly above the top of the casing on rails 24 (FIG. 1). Means are provided such as upstanding spaced walls 25 (FIG. 1) intermediate which stack 22 is so positioned. The ticket 23 at one end of the stack abuts suitable stop means, shown in FIG. 1 as fingers 26 extending inwardly of the walls 25. The other end of the stack is engaged by a bar 27 or the like, which may have a handle 28 (FIG. 3) for manual operation and (FIG. 3) a plate 29 depending therefrom through aperture 30 (FIG. 1) in the casing substantially coextensive with rails 24. Suitable means engage the plate 29 so that the ticket may be constantly urged toward stop end 26. Such means may be a constant-pressure motor or other means or, as shown in FIG. 3 exemplarily a cable 31 may be secured at one end to plate 29 and entrained over an idler roll 32 and pulley 33 and then fixed as at 34 to a bracket 35 secured to the casing, tension means 36 engaging the pulley 33 at one end and fixed to the casing at the other end 37. Complementary spline means 38, 39 may be provided on the plate 29 for movement of the bar 27 in line with the walls 25.

On occurrence of a condition, such as exemplarily, on movement of a vehicle out of the toll station 43 (FIG. 15) switch means are automatically closed.

As a further example, station 43 could be an out station where a punch device such as 48 is used, and the card or ticket could be picked up or processed thence in an accounting machine. For example, on passage of the vehicle rear wheel 44 (FIGS. 15 and 5) over switch treadle 45, the switch 46 is closed, thereby (through cable 50) actuating the means for separating the end ticket 23 from the stack and moving it (FIG. 13) against a stop 47 (FIG. 1) in line with printer plunger 48. The printer plunger 48 is actuated to press (dotted lines FIG. 13) the ticket against the printing head 96 (with customary printing ribbon feeding mechanism therebetween) and then stop 47 is displaced and the card automatically moved to an exposed ticket issuing position convenient to the driver (FIGS. 15 and 14) on actuation of switch 46 by the front wheels of the vehicle entering station 43, said ticket having been coded and time and date stamped at the FIG. 13 station. Switch 46 may, as shown in FIG. 5, be a pressure contact switch or any other switch such as would be urged to a given position by the presence of the vehicle wheel 44 at the station 43 (for example, it may be a switch actuated by light or other source or force).

The end card 23, which is urged against stops 26 as above noted, slid therefrom on closing of switch 46, completing the circuit for motor 51 (FIG. 7) through a relay and timing device for example, such as exemplified at 52 in FIG. 7 so that, for example, one revolution of the motor, will through timing cams 53, close switches 52, 54, 54a, 54b, for example. Switch 52 may thus close the circuit through a solenoid or other unit 55 (FIG. 1) and thus move shaft 56 in bearing 57 in the direction of arrow 58. As casing 49 is secured to the shaft, it is thus moved against the end ticket 23 of the stack. The front wall 59 (FIG. 1) of the casing 49 is (FIG. 8) provided with an aperture 60 and said casing has a vacuum line 63 (FIG. 9) connected at one end to the interior of the casing as through a bracket 64 or the like (FIG. 9), the other end of vacuum line 63 being connected to a vacuum pump or other means (not shown). The front wall 59 of the casing 49 is formed with concave vertical portion 65 in which the aperture 60 is disposed (FIG. 8) and with further concave portions 66, 67 vertically parallel therewith and with end lands (FIGS. 9) 61, 61a, and intermediate lands 62, 62a defining said concave portions. This contour of the front wall of the casing is very effective for the selection of the end ticket 23 and separation thereof from the remainder of the stack of tickets 22 (without disturbing said remainder) and without regard to variations in thickness of tickets due to manufacturing, moisture, and temperature differences, which may substantially affect the thickness of the ticket. Movement of the end ticket 23 past the stops 26 occurs on the reverse movement of the shaft 56 on opening switch 52 (FIG. 11a). The end card 23 is thus sucked into the concaved medial area 65 of the head 49 prior to any lift off from the stack. Such timing may be a function of the cam surface 53 and the timing unit with which switch 52 may be incorporated or connected for this purpose. One of the switches 54, may similarly control a second solenoid 70 (FIG. 3) for reciprocating a block 41 on a shaft 71 (FIGS. 3 and 1) which shaft may be fixed to the casing 21. Bearing 57 is fixed to block 41 through a slot in casing 21 so that actuation of solenoid 70 will move the bearing 57 in the direction of the arrow 69 (FIG. 12) to thus move the ticket in its desired plane (FIG. 6) intermediate driving and idler rollers 72, 73. The ticket also thus closes a switch 75 (FIG. 6).

At the moment of initial contact of the vacuum casing 49 with the end card 23 (FIG. 9) the medial concave portion of the casing 49 between the lands 62, 62a thereof and the medial portion of the card will define an area marked with cross-hatching in which initial vacuum will be created. This will result in the card 23 being drawn first against the medial concave portion of the casing 49 (FIG. 11) and partly inwardly of the end stops 26. This reduces the overall length of the card and permits easier removal from behind card stops 26. The second position (FIG. 11a) indicates the approximate form the card 23 takes after it has been removed from behind the card stops 26 and the third position (FIG. 12) indicates the card in its final position on the casing 49 being slid off the casing with the aid of the rollers 72, 73.

The vacuum head or casing 49 is constructed with interior plenum chamber 49a. The vacuum line is connected to the plenum via a flexible hose 63. The vacuum head 49 is pressed against the card stack with a pressure between zero and 1 pound making contact with the cards on lands 61, 61a, 62, 62a. A partial vacuum is created in the cross-hatched area 74 (FIG. 9) between lands 62, 62a, via the orifice 60. The configuration of the curved surface 61 between lands 62, 62a is especially advantageous. If a flat contact surface were provided between 62, 62a, with a central orifice a complete vacuum would have to be created immediately upon contact. This type of construction would allow, via the porosity of the card, the pick-up of one or more cards from the pack. It is possible to reduce the vacuum to pick-off just one card; however, the holding power at this level of vacuum is extremely unreliable. By using the FIG. 9 configuration disclosed herein, the partial vacuum created in the cross-hatched area is of sufficient force or power to move one card at a time and the holding power is increased when the card seats itself into the curved pocket and complete vacuum is accomplished. A pump connected to line 63, used successfully for example, has a capacity of 4 cu. feet of air per minute and a maximum of 18″ of mercury vacuum. Lands 61, 61a also serve a purpose in that they have a tendency to hold a second card in position while the first card is being taken in between lands 62, 62a.

Idler rollers 73 are carried at one end of h-shaped frame 76 (FIG. 2) which is pivoted or journalled medially as on a pin 77, which may be rotatably journalled to frame 78 and casing 21; a pin 89 similarly is rotatably journalled in the casing 21 and frame 78 and has fixed thereto a second h-shaped frame 88. Frame 78 is suitably fixed to casing 21 and serves as a guide along which the card moves in passage through the machine (FIG. 1) and as a bearing in which are freely rotatably mounted the armature shafts 72a, 85a of motors 76a, 90 (these shafts might instead be driven by only one motor, with belt or gear means to the other). Motors 76a, 90 may be constant or intermittently operated and the armature shafts 72a, 85a thereof have fixed thereto the driving rollers 72, 85 (FIG. 1). Directly behind these driving rollers and obscured thereby in FIG. 2 (but see FIG. 6) are the idler rollers 73, 84 carried by one end of each frame 76, 88 as presently explained. The card 23 is driven by the driving rollers when the idler rollers move the card against the driving rollers.

Idler rollers 73 may (FIG. 2) be connected by spindle 73a and idler rollers 84 by spindle 84a. The opposite end of the h-shaped frame 88 (FIG. 1) is pivotally connected at 79 to the shaft 80 of solenoid 81 and similarly the opposite end of h-shaped frame 76 is pivotally connected as at 91 (FIG. 2) to the shaft of the solenoid 92. Thus, on energization of the solenoids, the frames 76, 88 respectively are pivotally moved in the direction of the arrows 82, 93 (FIG. 1) and the idler rollers respectively press the card 23 against the driving rollers as presently further explained. Solenoid 81 is actuated by switch 75 (FIG. 6) to thus move the idler roller 73 of the frame 76 and ticket 23 toward drive roller 72 to thus drive the ticket 23 in the direction of arrow 83 (FIG. 6) and against the stop 47 (FIG. 13) the ticket in so doing passing between the similar idler and drive rollers 84, 85 (FIG. 1) and (FIG. 6) and closing switches 86, 87. The stop 47 is (FIG. 2) fixed by any suitable bracket means indicated at 89a in FIGS. 1 and 2 to the frame 88 or to the pin 89 which is journalled in 21. The free end 91 of second frame 88 (FIG. 2) is pivotally connected to the shaft of second solenoid 92 actuated by a cycle timer 40 (FIG. 6), actuated by the front wheels and switch 86 opens solenoid 81 and closes a relay to allow the treadle switch 46 (FIG. 5) to close and to operate when the front wheels of the next vehicle pass over the treadle 45. After the card is ejected by the front switch 75, the card-out switch 87 operates a traffic light or signal according to whether the card is taken or not and actuates an electric alarm if a car passes through the station without taking a ticket.

Printer plunger 48 is actuated by a sequenced timer 42 which closes the circuit to actuate solenoid 92 to cause roller 85 to engage the card and move it to the FIG. 14 position, marked by plunger 48 having moved the card (FIG. 13, dotted lines) against the printing head 96 (which may be a card punching head, time and other indicia being marked or indicated by holes); suitable inking or printing ribbon feed mechanisms may be employed at the station shown in FIG. 13 between the printing head 96 and ticket 23.

At the completion of the printing operation, the following sequence occurs: The solenoid 92 is energized, whereupon the frame 88 rotates in the direction of the arrow 93 (FIG. 1) rotating the stop 47 (with the frame) and clear of the path of ticket 23 while the idler roller 84 of frame 88 presses the ticket 23 against driver roller 85 moving the ticket 23 to the position shown in FIGS. 14 and 15, exposing the card to be conveniently taken by the operator of the vehicle entering the toll station 43. The rear wheels of the car leaving the toll station 43 actuate the treadle switch 45 to repeat the operation above described for selecting the next end ticket 23 from the stack and positioning it against the stop 47 where it rests until the next vehicle enters the toll station 43 and its front wheels passing over the treadle 45 advance the ticket to the indicia (FIG. 1) and FIG. 14 positions; the operation is thus repeated by the following vehicles in the toll station 43.

Having thus described our invention, what we claim as new and desire to secure by Letters Patent is:

1. A machine for processing tickets comprising a printing mechanism, a magazine for holding tickets on edge in face to face relationship, transfer mechanism movable perpendicular to a face of a ticket in the magazine to engage an end ticket and remove the same from the magazine, means for subsequently moving said mechanism in a plane removed from and parallel to the face of the ticket to carry the ticket, on edge, to a ticket advancing means, means to drive said ticket advancing means to said printing mechanism, means responsive to a sensed condition for imprinting said ticket and for further advancing the ticket through the printing mechanism to a position where it may be manually grasped and removed from the machine.

2. A machine as claimed in claim 1 wherein the magazine has stops engaging the vertical edges of the cards extending toward each other a short distance and the transfer mechanism comprises a vacuum casing having a front wall with a concave central portion whereby the suction in the casing will cause an engaged ticket to buckle and be easily strippable from the magazine.

3. A machine as claimed in claim 2 wherein the front wall of the casing is further provided with two lateral concave portions each terminating in a land at the ends of the casing, all to promote the removal of one ticket only from the magazine.

4. A machine as claimed in claim 1 wherein said advancing means includes a tiltable frame carrying an idler roller, a driven roller opposite the idler roller, and a stop carried by the tiltable frame in position to stop a ticket with a portion thereof opposite the printing mechanism when the idler roller is raised and to remove the stop to permit the advance of the ticket past the printing mechanism when the idler roller is engaged with the ticket, the ticket being advanced by interposition thereof between the idler and driven rollers.

5. A machine for processing tickets comprising a printing mechanism, a magazine for holding a group of tickets, transfer mechanism operative in response to a sensed condition for removing a ticket from the group and transporting it to a first ticket advancing means, a switch controlled by a so transported ticket, means under control of the switch to render said first ticket advancing means operative and to advance the ticket to a position where it may be engaged and advanced by a second ticket advancing means, said printing mechanism being adjacent and beyond said second ticket advancing means, a ticket stop beyond the printing mechanism, said stop being movable with said second ticket advancing means, whereby on initiation of movement of said second ticket advancing means said stop moves out of the path of a ticket, and means responsive to a sensed condition for operating the printing mechanism and the second ticket advancing means.

6. A machine for processing tickets comprising a magazine for holding a group of tickets, a ticket transfer casing, a first and second ticket advancing means, a printing mechanism and a stop, said transfer casing being movable between a position where it can pick up a ticket from the magazine and a position where it can move the ticket into the first ticket advancing means, means for so moving the transfer casing, said first and second ticket advancing means comprising a support frame carrying driven rollers, one adjacent each end thereof, a first pivoted frame and second pivoted frame, each pivoted intermediate the ends of the pivoted frames on the main frame, an idler roller on each pivoted frame opposite the driven rollers, dual pivoted frame operating means, one each connected to the other and adjacent ends of the pivoted frames, said printing member being located beyond the second pivoted frame, means to operate the printing member, said stop being carried by the second pivoted frame and extending to a position beyond the printing member and in the path of movement of an advancing ticket, said stop being removable from the path of the ticket upon movement of the second pivoted frame to bring the associated idler roller close to the companion driven roller.

References Cited in the file of this patent
UNITED STATES PATENTS

| | | |
|---|---|---|
| 588,668 | Van der Valk | Aug. 24, 1897 |
| 1,855,132 | Jones et al. | Apr. 19, 1932 |
| 2,172,329 | Bryce | Sept. 5, 1939 |
| 2,810,620 | Henry et al. | Oct. 22, 1957 |
| 3,051,953 | Shepard | Aug. 28, 1962 |
| 3,057,422 | Cunningham et al. | Oct. 9, 1962 |